United States Patent
Tang

(10) Patent No.: US 11,105,826 B2
(45) Date of Patent: Aug. 31, 2021

(54) INERTIAL SENSOR WITH INTEGRATED DAMPING STRUCTURES

(71) Applicant: NXP USA, Inc., Austin, TX (US)

(72) Inventor: Jun Tang, Gilbert, AZ (US)

(73) Assignee: NXP USA, Inc., Austin, TX (US)

( * ) Notice: Subject to any disclaimer, the term of this patent is extended or adjusted under 35 U.S.C. 154(b) by 134 days.

(21) Appl. No.: 16/575,847

(22) Filed: Sep. 19, 2019

(65) Prior Publication Data

US 2021/0088545 A1     Mar. 25, 2021

(51) Int. Cl.
*G01P 15/08* (2006.01)
*G01P 1/00* (2006.01)
*G01P 15/125* (2006.01)

(52) U.S. Cl.
CPC ............ *G01P 1/003* (2013.01); *G01P 15/125* (2013.01); *G01P 2015/0882* (2013.01)

(58) Field of Classification Search
CPC .................... G01P 1/003; G01P 2015/0831
See application file for complete search history.

(56) References Cited

U.S. PATENT DOCUMENTS

| | | | |
|---|---|---|---|
| 8,555,719 B2 | 10/2013 | McNeil et al. | |
| 8,746,066 B2 | 6/2014 | Classen et al. | |
| 9,720,012 B2 | 8/2017 | Tang et al. | |
| 2017/0023608 A1* | 1/2017 | Tang | G01P 15/125 |

* cited by examiner

*Primary Examiner* — Walter L Lindsay, Jr
*Assistant Examiner* — Andrew V Do

(57) ABSTRACT

An inertial sensor includes a movable mass spaced apart from a surface of the substrate. The movable mass is adapted for motion about a rotational axis positioned between first and second ends of the movable mass in response to a first force imposed upon the movable mass in a first direction that is perpendicular to the surface of the substrate. The inertial sensor further includes a damping system configured to limit motion of the movable mass in a second direction perpendicular to the first direction. The damping system includes a first damping structure coupled to the movable mass, a second damping structure adjacent to the first damping structure, the first and second damping structures being spaced apart from the surface of the substrate, and a spring structure interconnected between the movable mass and the second damping structure.

14 Claims, 4 Drawing Sheets

INERTIAL SENSOR WITH INTEGRATED DAMPING STRUCTURES

TECHNICAL FIELD OF THE INVENTION

The present invention relates generally to microelectromechanical systems (MEMS) inertial sensors. More specifically, the present invention relates to inertial sensors with integrated damping structures.

BACKGROUND OF THE INVENTION

Microelectromechanical systems (MEMS) sensors are widely used in applications such as automotive, inertial guidance systems, household appliances, protection systems for a variety of devices, and many other industrial, scientific, and engineering systems. Such MEMS sensors are used to sense a physical condition such as acceleration, pressure, angular rotation, or temperature, and to provide an electrical signal representative of the sensed physical condition.

Capacitive-sensing MEMS inertial sensor designs are highly desirable for operation in both acceleration and angular rotation environments and in miniaturized devices, due at least in part to their relatively low cost. Capacitive accelerometers sense a change in electrical capacitance, with respect to acceleration, to vary the output of an energized circuit. One common form of accelerometer is a two-layer capacitive transducer having a "teeter-totter" or "see saw" configuration. This commonly utilized transducer type uses a movable mass or plate that rotates under Z-axis acceleration above a substrate. The accelerometer structure can measure two distinct capacitances to determine differential or relative capacitance.

SUMMARY

Aspects of the disclosure are defined in the accompanying claims.

In a first aspect, there is provided an inertial sensor comprising a substrate; a movable mass spaced apart from a surface of the substrate, the movable mass being adapted for motion about a rotational axis positioned between first and second ends of the movable mass in response to a first force imposed upon the movable mass in a first direction that is perpendicular to the surface of the substrate; and a damping system configured to limit motion of the movable mass in a second direction perpendicular to the first direction. The damping system includes a first damping structure coupled to the movable mass; a second damping structure adjacent to the first damping structure, the first and second damping structures being spaced apart from the surface of the substrate; and a spring structure interconnected between the movable mass and the second damping structure.

In a second aspect, there is provided an inertial sensor comprising a substrate; a movable mass spaced apart from a surface of the substrate, the movable mass being adapted for motion about a rotational axis positioned between first and second ends of the movable mass in response to a first force imposed upon the movable mass in a first direction that is perpendicular to the surface of the substrate, the movable mass including a first portion between the rotational axis and the first end and a second portion between the rotational axis and the second end, wherein the second portion has a greater mass than the first portion; and a damping system located at the second portion, the damping system being configured to limit motion of the movable mass in a second direction perpendicular to the first direction. The damping system includes multiple first damping structures coupled to the movable mass; multiple second damping structures interleaved with the multiple first damping structures, the first and second damping structures being spaced apart from the surface of the substrate; and a spring structure interconnected between the movable mass and the second damping structures.

In a third aspect, there is provided an inertial sensor comprising a substrate; a movable mass spaced apart from a surface of the substrate, the movable mass being adapted for motion about a rotational axis positioned between first and second ends of the movable mass in response to a first force imposed upon the movable mass in a first direction that is perpendicular to the surface of the substrate, the movable mass including a first portion between the rotational axis and the first end and a second portion between the rotational axis and the second end, wherein the second portion has a greater mass than the first portion; and a damping system located at the second portion, the damping system being configured to limit motion of the movable mass in a second direction perpendicular to the first direction. The damping system includes a first damping structure coupled to the movable mass; a second damping structure adjacent to the first damping structure, the first and second damping structures being spaced apart from the surface of the substrate; and a spring structure interconnected between the movable mass and the second damping structure, wherein the first and second damping structures are spaced apart by a gas-containing gap having a predefined width, the second damping structure is configured to become immovable relative to the first damping structure in response to a second force imposed upon the movable mass in the second direction, the first damping structure is configured to move together with the movable mass in response to the second force, and the width of the gap is reduced as the first damping structure moves in the second direction thereby causing squeezing of the gas in the gap.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, embodiments disclosed herein entail microelectromechanical systems (MEMS) inertial sensors with integrated damping structures for improved sensitivity and reliability in the small form factors desired for a variety of functions. More particularly, Z-axis teeter-totter inertial sensors include damping structures that enable effective damping of in-plane parasitic modes with little to no impact to the area of the movable mass. Although an inertial sensor in the form of an accelerometer is described herein, it should be understood that the damping structures may be adapted for use in other inertial sensors to achieve improvements in sensitivity and/or reliability.

The instant disclosure is provided to further explain in an enabling fashion at least one embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of deposition, patterning, etching, and so forth. Accordingly, although different shading and/or hatching is utilized in the illustrations, the different elements within the structural layers may be formed out of the same material.

Figure 1:
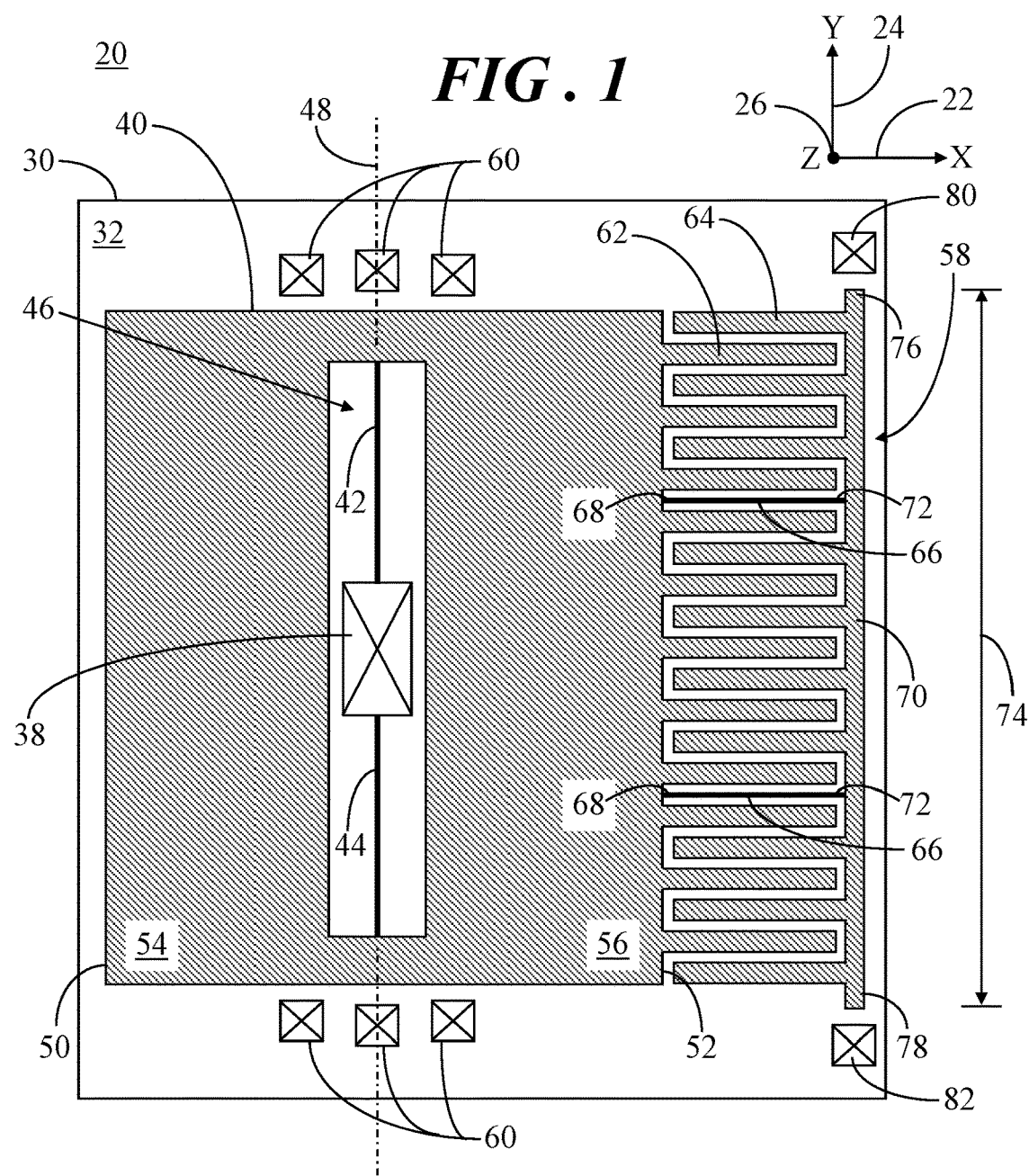
FIG. 1 shows a plan view of a microelectromechanical systems (MEMS) inertial sensor in accordance with an embodiment.
Figure 2:
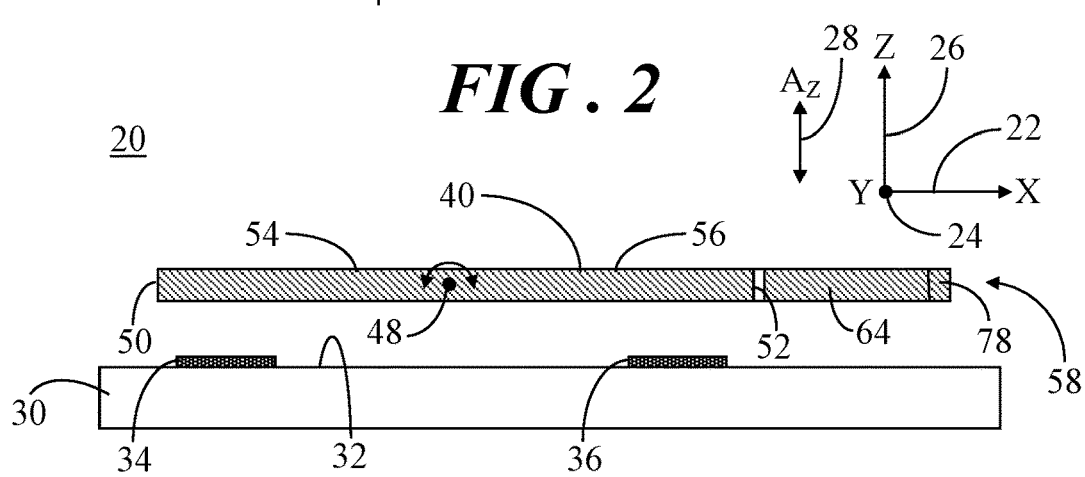
FIG. 2 shows a side view of the inertial sensor of FIG. 1.

Referring to FIGS. 1-2, FIG. 1 shows a plan view of a MEMS inertial sensor 20 in accordance with an embodiment and FIG. 2 shows a side view of inertial sensor 20. Inertial sensor 20, in the form of an accelerometer, is constructed as a "teeter-totter" type inertial sensor. Accordingly, inertial sensor 20 is referred to herein as an accelerometer 20. By convention, accelerometer 20 is illustrated as having a generally planar structure within an X-Y plane in which an X-axis 22 is directed rightward and leftward in FIG. 1, a Y-axis 24 is directed upward and downward in FIG. 1, and a Z-axis 26 is directed out of the page (normal to X- and Y-axes 22, 24) in FIG. 1. Correspondingly, in the side view illustration of FIG. 2, the three-dimensional coordinate system is represented in which X-axis 22 is directed rightward and leftward on the page, Z-axis 26 is directed upward and downward on the page, and Y-axis 24 is directed out of the page. In general, accelerometer 20 is adapted to sense Z-axis acceleration, represented by an arrow 28 in FIG. 2 while damping parasitic motion in the X-Y plane.

Accelerometer 20 includes a substrate 30 having a generally planar surface 32. Electrode elements 34, 36 (see FIG. 2) and a suspension anchor 38 are formed on surface 32 of substrate 20. A movable mass 40 is spaced apart from surface 32 of substrate 30. More particularly, accelerometer 20 includes suspension springs 42, 44 interconnecting movable mass 40 with suspension anchor 38 so that movable mass 40 is suspended above substrate 30. Suspension anchor 38 is positioned at an approximate center of an opening 46 along a rotational axis 48 of movable mass 40, in which rotational axis 48 is positioned between first and second ends 50, 52 of movable mass 40.

For consistency throughout the description of the following figures, any structures, such as suspension anchors 38, that are directly connected to, or formed on, surface 32 of substrate 30 are illustrated with an "X" through them. Elements that are suspended above surface 32 of substrate 30 are illustrated with downward and rightward narrow hatching. Spring structures suspended above surface 32 are generally represented by solid lines.

Movable mass 40 includes a first portion 54 between rotational axis 48 and first end 50 and a second portion 56 between rotational axis 48 and second end 52. Movable mass 40 is adapted for rotation about rotational axis 48 in response to a first force (e.g., Z-axis acceleration 28) imposed upon movable mass 40 in a first direction that is perpendicular to surface 32 of substrate 30 (e.g., parallel to Z-axis 26). When intended for operation as a teeter-totter type accelerometer, second portion 56 of movable mass 40 may be formed with relatively greater mass than first portion 54 of movable mass 40. Commonly, the greater mass of second portion 56 may be created by offsetting rotational axis 48 such that second portion 56 is longer than first portion 54. In other configurations, this difference in mass may be accomplished by adding mass to second portion 56 relative to first portion 54, by removing mass from first portion 54 relative to second portion 56, and so forth. However, in an embodiment, the greater mass of second portion 56 may be accomplished at least in part by adding mass, in the form of a damping system (described below), formed at second end 52 of movable mass 40 and suspended above surface 32 of substrate 30.

In teeter-totter inertial sensor designs, it is difficult to remove in-plane parasitic motion of the movable mass. The in-plane parasitic motion may be in a direction parallel to Y-axis 24 and/or in a direction parallel to X-axis 22 and/or in-plane pivotal motion about Z-axis 26. The in-plane parasitic motion is typically underdamped with a high Q-factor and a relatively heavy movable mass. The Q-factor is a dimensionless parameter that describes how underdamped an oscillator may be. A higher Q-factor indicates a lower rate of energy loss relative to the stored energy of the oscillator (that is, the oscillations die out more slowly). Accordingly, under in-plane high-g shock events, especially when the high-g shock is close to the resonance peak of the movable mass, the movable mass may strike travel stops or a stop frame with high speed and large contact force. Such a high-g shock can damage the movable mass and/or the travel stops or stop frame. Unfortunately, a damaging high-g shock may be difficult to avoid during assembly or in field applications.

Different approaches have been used to avoid this issue. For example, fixed damping fingers have been implemented to reduce or restrict oscillations due to the effects of high-g shock events. Such damping fingers are coupled to the surface of the substrate and may be positioned within openings extending through the movable mass. Damping occurs by a squeeze-film effect in which a gas present between the fixed damping fingers and openings in the movable mass is squeezed as the movable mass translates in response to the in-plane parasitic motion. In such a configuration, significant damping may be achieved with enough added fixed damping fingers. However, the openings extending through the movable mass consumes area of the movable mass. Indeed, more consumption of the area of the movable mass occurs in response to greater damping requirements. Since the area of the movable mass is reduced, the actual mass or weight of the movable mass is correspondingly reduced. Thus, the sensitivity of the inertial sensor may be commensurately reduced. Alternatively, a larger die size may be required for achieving a desired sensitivity, which is counter to the goal of minimizing die size.

Another approach is to tune parasitic motion into frequencies that the inertial sensor is not likely to be exposed to. This approach requires a pre-defined "safe zone" as a design target. However, such an approach may not be practical for many inertial sensors because a pre-defined "safe zone" is difficult to define. Furthermore, turning parasitic modes may be a challenge to maintaining high sensitivity performance. Embodiments described herein entail suspended movable damping fingers (in lieu of the fixed damping fingers discussed above) that achieve large damping improvements while having very little to no impact on the area of the movable element.

Accordingly, accelerometer 20 further includes a damping system 58 configured to limit motion of movable mass 40 in a direction perpendicular to Z-axis 26. In the example of FIGS. 1-2, damping system 58 is configured to limit motion of movable mass 40 in response to a parasitic force parallel to Y-axis 24. Damping system 58 is suspended above surface 32 of substrate and is located at second portion 56 of movable mass 40. Additionally, damping system 58 contributes to the greater mass of second portion 56 relative to first portion 54, as will be discussed in greater detail below. Accelerometer 20 further includes at least one travel stop 60 (six shown) coupled to or otherwise formed on surface 32 of substrate 30. As will be further discussed below, damping system 58 is configured to reduce a contact force between movable mass 40 and travel stops 60 in response to limiting motion of movable mass 40. Although travel stops 60 are illustrated as being separate structures, in other embodiments, a single travel stop may be configured as a frame structure surrounding movable mass 40 and damping system 58.

Damping system 58 includes multiple first damping structures 62, multiple second damping structures 64, and one or more spring structures 66 (two shown) interconnected between movable mass 40 and second damping structures 62. Each of first and second damping structures 62, 64 is in a comb-shaped configuration such that second damping structures 64 are generally interleaved with first damping structures 62.

First damping structures 62 are coupled to and extend from second end 52 of movable mass 40. Additionally, each of spring structures 66 includes a first spring end 68 extending from second end 52 of movable mass 40. A beam element 70 is spaced apart from surface 32 of substrate 30 and is laterally displaced away from second end 52 of movable mass 40. Second spring ends 72 of spring structures 66 are coupled to beam element 70. Additionally, second damping structures 64 are coupled to and extend from beam element 70 toward second end of movable mass 40. Thus, spring structures 66 along with beam element 70 suspend second damping structures 64 from movable mass 40 above surface 32 of substrate 30.

In general, the greater mass of second portion 56 of movable mass 40 relative to first portion 54 of movable mass 40 is critical to producing the teeter-totter motion of movable mass 40 under Z-axis acceleration 28. Second portion 54 includes two arrays of damping structures. One array of damping structures, e.g., first damping structures 62, are directly connected to movable mass 40. While the other array of damping structures, e.g., second damping structures 64, are connected to movable mass 40 via spring structures 66. Thus, both first damping structures 62 and second damping structures 64 contribute to the mass of second portion 54 of movable mass 40 under Z-axis acceleration 28 to provide greater torque and therefore greater sensitivity to Z-axis acceleration 28.

Rotational axis 48 is substantially parallel to surface 32 of substrate 30, and in this configuration, rotational axis 48 is parallel to Y-axis 26. Beam element 70 has a longitudinal dimension 74 (e.g., a length) between first and second beam ends 76, 78 of beam element 70, in which longitudinal dimension 74 is parallel to rotational axis 48. That is, beam element 70 is aligned with Y-axis 24. Accelerometer 20 further includes first and second damping stops 80, 82 coupled to surface 32 of substrate and positioned proximate corresponding ones of first and second beam ends 76, 78.

Figure 3:
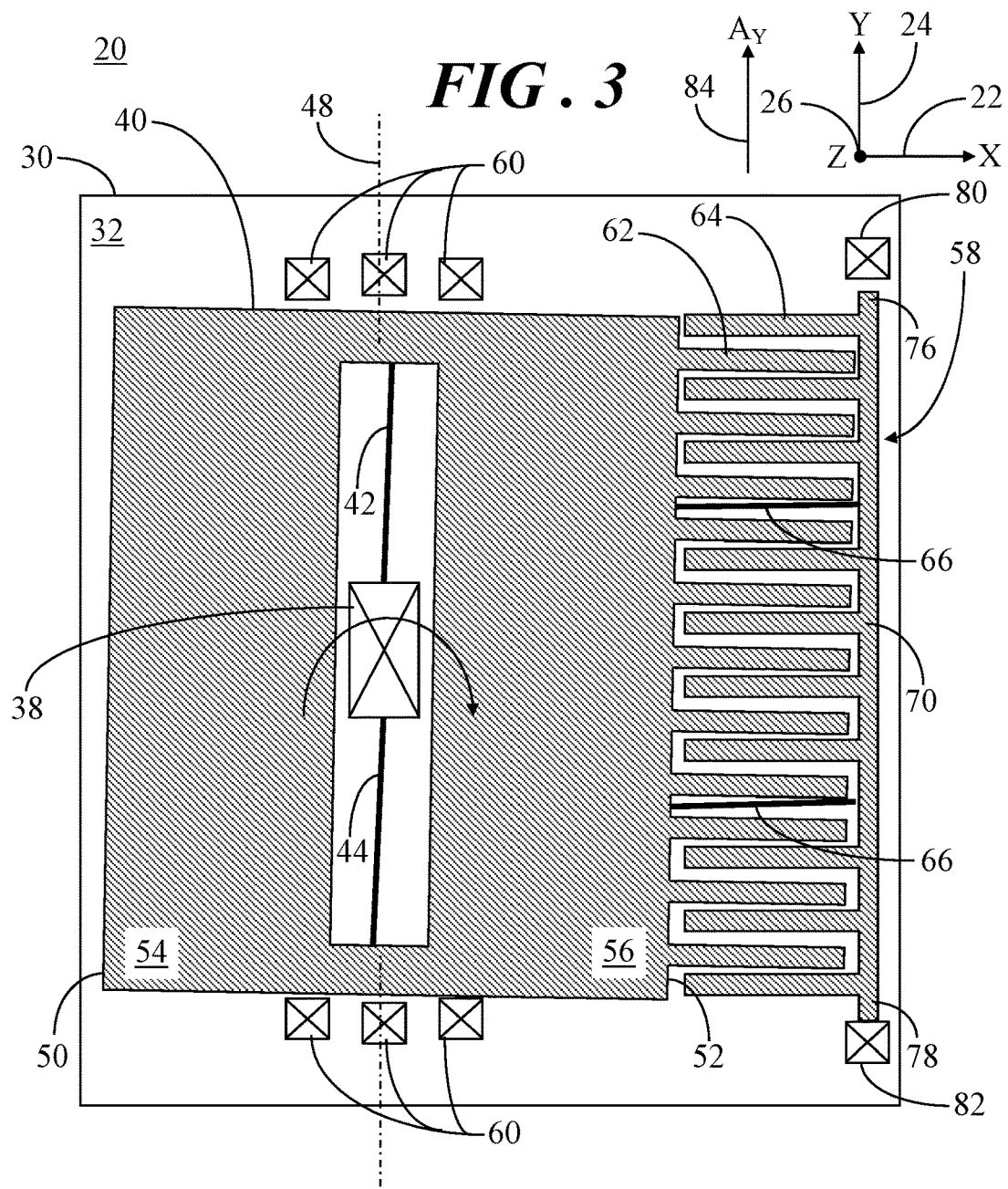
FIG. 3 shows a plan view of the inertial sensor of FIG. 1 being subjected to a force in a direction perpendicular to a sensing direction of the inertial sensor.

Referring now to FIG. 3, FIG. 3 shows a plan view of inertial sensor 20 being subjected to a force in a direction perpendicular to a sensing direction of inertial sensor 20. In this instance, the force may be a high-g shock event, represented by an arrow 84, generally parallel to Y-axis 24. This force is referred to herein as a Y-axis acceleration 84, labeled $A_y$. Y-axis acceleration 84 is imposed upon movable mass 40 in a direction parallel to Y-axis 24, thereby causing in-plane parasitic motion of movable mass 40.

In response to a high-g Y-axis acceleration 84 parallel to Y-axis 24, movable mass 40 along with first and second damping structures 62, 64 of damping system 58 may undergo in-plane torsion motion (i.e., pivotal motion about Z-axis 26). For example, a positive Y-axis force 84 causes rotation of Z-axis 26 such that second portion 56 of movable mass 40 having the greater mass translates in the opposite direction, e.g., a negative Y-direction. Movable mass 40 along with first and second damping structures 62, 64 moves until one of first and second beam ends 76, 78 contacts a corresponding one of damping stops 80, 82. That is, there is no damping effect prior to either of first and second beam ends 76, 78 contacting the corresponding one of damping stops 80, 82. However, once one of first and second beam ends 76, 78 contacts a corresponding one of damping stops 80, 82, second damping structures 64 become immovable relative to first damping structures 62. That is, spring structures 66 suitably flex so that first damping structures 62 can continue moving together with movable mass 40. As such, the gaps between first and second damping structures 62, 64 get smaller. Such relative movement enables a squeeze film damping effect to occur.

Figure 4:
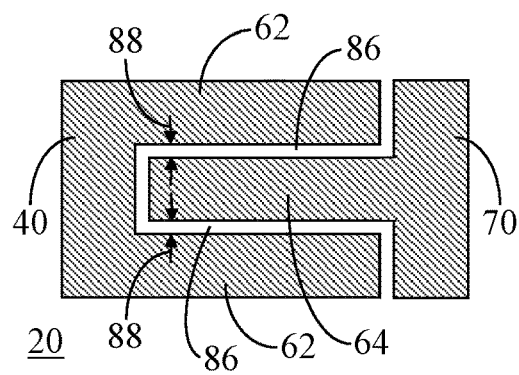
FIG. 4 shows a partial enlarged plan view of the inertial sensor of FIG. 1.
Figure 5:
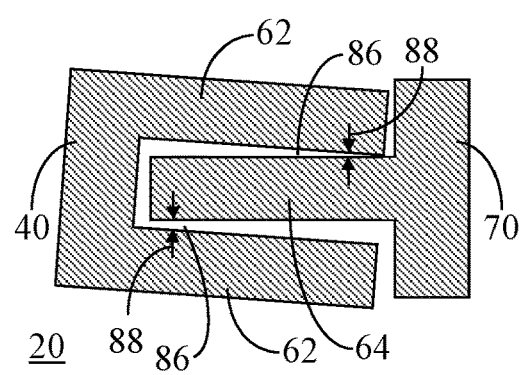
FIG. 5 shows the partial enlarged plan view corresponding to the view in FIG. 4 being subjected the force in the direction perpendicular to the sensing direction.

Referring to FIGS. 4 and 5 in connection with FIG. 3, FIG. 4 shows a partial enlarged plan view of inertial sensor 20 and FIG. 5 shows the partial enlarged plan view of inertial sensor 20 being subjected Y-axis acceleration 84. Damping system 58 includes multiple interleaved first and second damping structures 62, 64 in each case resulting in a gas-containing gap 86. As best seen in FIG. 4, first and second damping structures 62, 64 are spaced apart by gas-containing gaps 86 having a defined width 88 which provides the damping. In some embodiments, the gas may be air. However, other suitable gases may be implemented in other embodiments.

In the example presented in FIGS. 3 and 5, movable mass 40 along with first and second damping structures 62, 64 of damping system 58 undergoes motion until second beam end 78 of beam 70 contacts second damping stop 82. Thus, second damping structures 64 become temporarily stationary while first damping structures 62 continue moving due to Y-axis acceleration 84. As best seen in FIG. 5, the movement of first damping structures 62 relative to second damping structures 64 causes width 88 of gaps 86 to become reduced. The damping effect results when the gas present in gaps 86 is squeezed between first and second damping structures 62, 64 in response to the reduction in width 88 of gaps 86.

The damping can result in a reduction or restriction of the in-plane parasitic motion of movable mass 40 due to the parasitic Y-axis acceleration 84. That is, the damping effect may limit the motion of movable mass 40 along Y-axis 24. However, damping stops 80, 82 may not be sufficient to fully stop the in-plane parasitic motion of movable mass 40. As such, accelerometer 20 additionally includes travel stops 60 in some embodiments. The damping that occurs after second damping structures 64 become temporarily stationary may significantly reduce the contact force between movable mass 40 and travel stops 60 to correspondingly reduce the risk of breakage of travel stops 60. Thereafter, a restoring force allows movable mass 40 and first and second damping structures 62, 64 to return to their nominal position (FIG. 1) between travel stops 60 and damping stops 80, 82 after Y-axis acceleration 84 is removed.

The damping effect of damping system 58 is a function of, among other things, the quantity and length of mutually complementary first and second damping structures 62, 64. As such the design of accelerometer 20 can be tuned to have more damping (e.g., by increasing the quantity of damping structures 62, 64 and/or by increasing the length of damping structures 62, 64) or less mass depending upon particular design requirements.

Accordingly, an embodiment entails movable suspended damping structures that achieve significant improvements in damping Y-axis acceleration 84 while having very little or no impact on the area of a single proof mass teeter-totter design, e.g., movable mass 40. However, this damping approach is not limited to damping in-plane parasitic motion in a direction parallel to Y-axis 24. Additionally, this damping approach may be implemented to improve damping in both X and Y directions (FIG. 6) or only in the X direction (FIG. 7).

Figure 6:
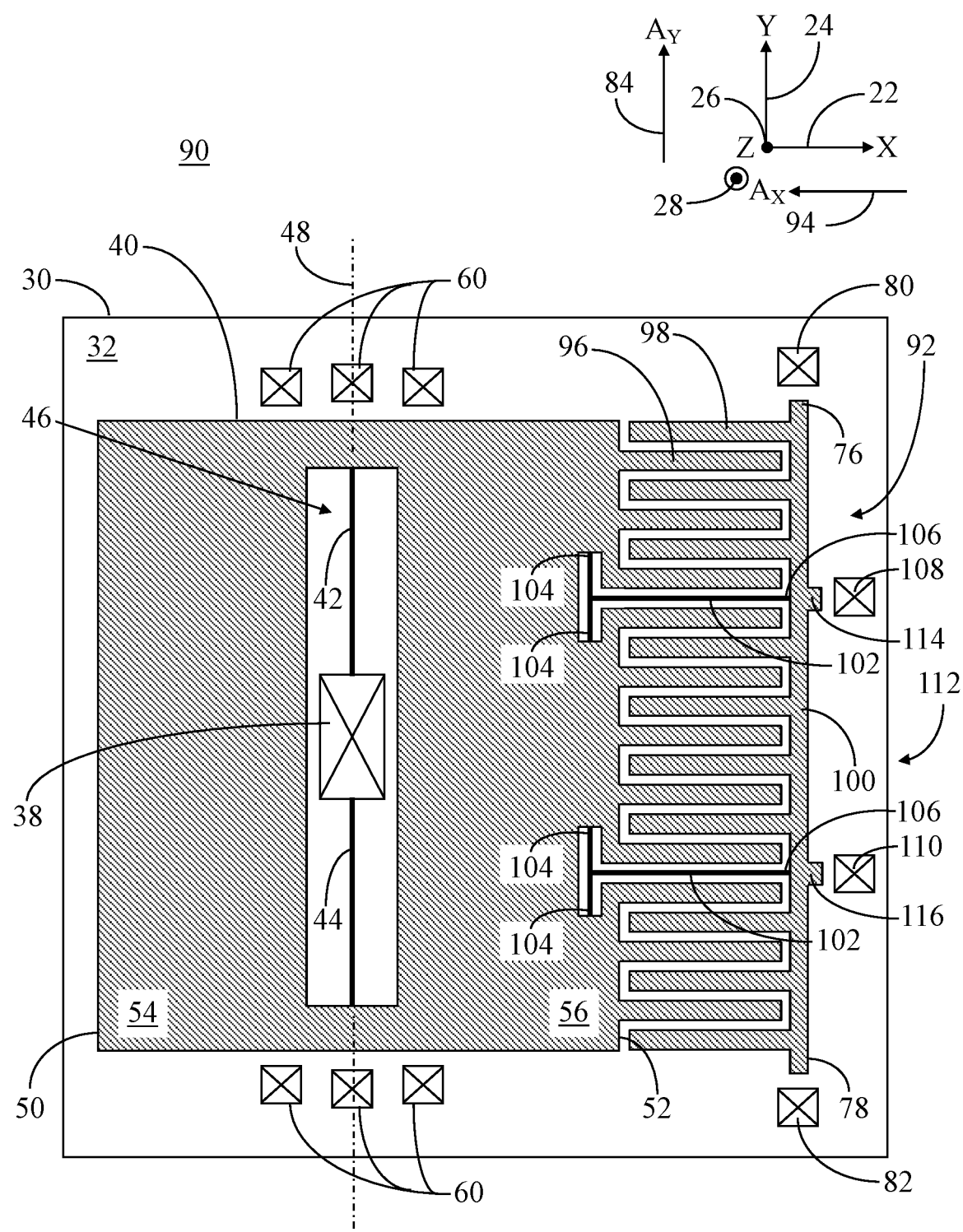
FIG. 6 shows a plan view of an inertial sensor in accordance with another embodiment.
Figure 7:
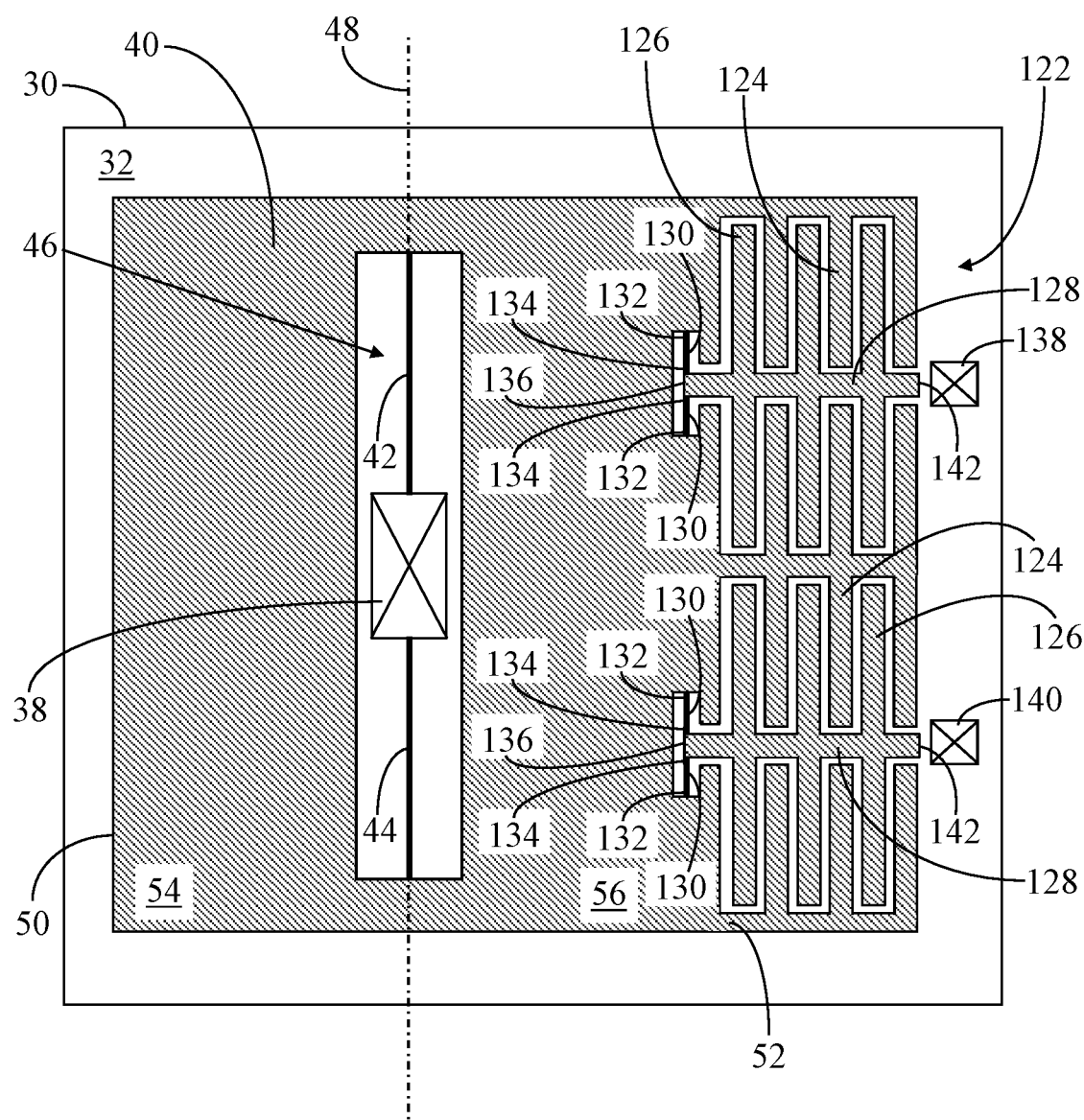
FIG. 7 shows a plan view of an inertial sensor in accordance with yet another embodiment.

FIG. 6 shows a plan view of an inertial sensor 90 in accordance with another embodiment. Again, inertial sensor 90 is constructed as a "teeter-totter" type accelerometer. As such accelerometer 90 is adapted to sense Z-axis acceleration 28, represented by the encircled black dot indicating its direction out of the page, while damping in-plane parasitic motion along both of X- and Y-axes 22, 24. Accelerometer 90 is similar to accelerometer 20 (FIG. 1). Hence, common features will utilize the same reference numerals and the description of such will be shortened or eliminated for brevity.

Accelerometer 90 includes substrate 30 having surface 32, electrode elements 34, 36 (not visible), and suspension anchor 38 formed on surface 32 of substrate 20. Movable mass 40 is spaced from surface 32 of substrate 30 and is suspended above substrate 30 via suspension springs 42, 44. Movable mass 40 includes first and seconds portions 54, 56, and is adapted for rotation about rotational axis 48 in response to Z-axis acceleration 28.

In accordance with the embodiment of FIG. 6, accelerometer 90 further includes a damping system 92 configured to limit motion of movable mass 40 in directions perpendicular to Z-axis 26. In particular, damping system 92 is configured to limit motion of movable mass 40 in response to a parasitic force parallel to Y-axis 24 (e.g., Y-axis acceleration 84) and in response to a parasitic force parallel to X-axis 22 (referred to herein as an X-axis acceleration 94). Damping system 92 is located at second portion 56 of movable mass 40, and thus contributes to the greater mass of second portion 56 relative to first portion 54. In some embodiments, accelerometer 90 further includes travel stops 60 coupled to or otherwise formed on surface 32 of substrate 30.

Like damping system 58, damping system 92 also includes multiple first damping structures 96 coupled to and extending from second end 52 of movable mass 40 and multiple second damping structures 98 coupled to and extending from a beam element 100 toward second end 52 of movable mass 40. Beam element 100 is again parallel to rotational axis 48 and is thus aligned with Y-axis 24. Damping system 92 further includes one or more spring structures 102 (two shown) having first spring ends 104 coupled to second end 52 of movable mass and second spring ends 106 coupled to beam element 100. Along with first and second damping stops 80, 82, accelerometer 90 further includes third and fourth damping stops 108, 110 coupled to surface 32 of substrate 30 and positioned proximate an intermediate region 112 of beam element 100. In some embodiments, beam element 100 further includes one or more protrusion elements 114, 116 (two shown) extending from intermediate region 112 of beam element 100 and corresponding with the locations of third and fourth damping stops 108, 110.

Spring structures 102 are suitably configured to flex in-plane in both of the X and Y directions to enable the damping effect due to X-axis acceleration 94 and/or Y-axis acceleration 84. Damping in response to Y-axis acceleration 84 has been described previously. Damping in response to X-axis acceleration 94 occurs in a similar manner. For example, as protrusion elements 114, 116 of beam element 100 contact third and fourth damping stops 108, 110 in response to X-axis acceleration 94, second damping structures 98 stop moving while first damping structures 96 continue to move along with movable mass 40. Thus, squeeze film damping becomes effective in the X-direction in response to X-axis acceleration 94.

FIG. 7 shows a plan view of an inertial sensor 120 in accordance with yet another embodiment. Again, inertial sensor 120 is constructed as a "teeter-totter" type accelerometer. As such accelerometer 120 is adapted to sense Z-axis acceleration 28, represented by the encircled black dot indicating its direction out of the page, while damping in-plane parasitic motion along X-axis 22. Accelerometer 120 is similar to accelerometer 20 (FIG. 1) and accelerometer 90 (FIG. 6). Hence, common features will utilize the same reference numerals and the description of such will be shortened or eliminated for brevity.

Accelerometer 90 includes substrate 30 having surface 32, electrode elements 34, 36 (not visible), and suspension anchor 38 formed on surface 32 of substrate 20. Movable mass 40 is spaced from surface 32 of substrate 30 and is suspended above substrate via suspension springs 42, 44. Movable mass 40 includes first and seconds portions 54, 56, and is adapted for rotation about rotational axis 48 in response to Z-axis acceleration 28.

In accordance with the embodiment of FIG. 7, accelerometer 120 further includes a damping system 122 configured to limit motion of movable mass 40 in a direction parallel to X-axis 22. In particular, damping system 122 is configured to limit motion of movable mass 40 in response to a parasitic force parallel to X-axis 22 (e.g., X-axis acceleration 94). Damping system 122 is located at second portion 56 of movable mass 40, and thus contributes to the greater mass of second portion 56 relative to first portion 54. Although not shown, in some embodiments, accelerometer 120 may further includes travel stops coupled to or otherwise formed on surface 32 of substrate 30 proximate first and second ends 50, 52 of movable mass 40.

Damping system 122 includes multiple first damping structures 124 coupled to and extending from second end 52 of movable mass 40 and multiple second damping structures 126 coupled to and extending from one or more beam elements 128 spaced apart from and parallel to surface 32 of substrate 30. Second damping structures 126 are interleaved with first damping structures 124. Damping system 122 further includes one or more spring structures 130 interconnected between movable mass 40 and second damping structures 126. The illustrated configuration includes two beam elements 128 and thus two corresponding spring structures 130. It should be understood, however, that alternative embodiments may include a single beam element 128 or more than two beam elements 128. In accordance with the illustrated embodiment, each of beam elements 128 is oriented perpendicular to rotational axis 48. That is, each of beam elements 128 is aligned with X-axis 22.

First spring ends 132 of spring structures 130 are coupled to movable mass 40 and second spring ends 134 of spring structures 130 are coupled to a first beam ends 136 of beam elements 128. Second damping structures 126 are coupled to and extend perpendicularly from beam elements 128. More particularly, first and second damping structures 124, 126 are oriented parallel to rotational axis 48 such that they are aligned with Y-axis 24. Accelerometer 120 further includes damping stops 138, 140 coupled to surface 32 of substrate 30 and positioned proximate a second beam end 142 of each of beam elements 128. In some embodiments, beam elements 128 may extend beyond an outer boundary of first and second damping structures 124, 126 toward damping stops 138, 140.

Spring structures 124 are suitably configured to flex in-plane in the X direction to enable the damping effect due to X-axis acceleration 94. Damping in response to X-axis acceleration 94 occurs in a similar manner as discussed above. For example, as second beam ends 142 of beam elements 128 contact third and fourth damping stops 138, 140 in response to X-axis acceleration 94, second damping structures 126 stop moving while first damping structures 124 continue to move along with movable mass 40. Thus, squeeze film damping becomes effective in the X-direction in response to X-axis acceleration 94.

Embodiments disclosed herein entail a microelectromechanical systems (MEMS) inertial sensors with integrated damping structures for improved sensitivity and reliability in the small form factors desired for a variety of functions. More particularly, Z-axis teeter-totter inertial sensors include damping structures that enable effective damping of in-plane parasitic modes with little to no impact to the area of the movable mass. Damping structures are disclosed that can dampen in-plane parasitic motion along the X-axis, the Y-axis, or along both X- and Y-axes.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An inertial sensor comprising:
    a substrate;
    a movable mass spaced apart from a surface of the substrate, the movable mass being adapted for motion about a rotational axis positioned between first and second ends of the movable mass in response to a first force imposed upon the movable mass in a first direction that is perpendicular to the surface of the substrate;
    a damping system configured to limit motion of the movable mass in a second direction perpendicular to the first direction, the damping system including:
        a first damping structure coupled to the movable mass;
        a second damping structure adjacent to the first damping structure, the first and second damping structures being spaced apart from the surface of the substrate; and
        a spring structure interconnected between the movable mass and the second damping structure; and
    at least one travel stop coupled to the surface of the substrate proximate the movable mass, the damping system being configured to reduce a contact force between the movable mass and the at least one travel stop in response to limiting the motion of the movable mass in the second direction.

2. The inertial sensor of claim 1 wherein the movable mass includes a first portion between the rotational axis and the first end and a second portion between the rotational axis and the second end, wherein the second portion has a greater mass than the first portion, and the damping system is located at the second portion.

3. The inertial sensor of claim 2 wherein the first and second damping structures of the damping system are configured to contribute to the greater mass of the second portion of the movable mass relative to the first portion of the movable mass.

4. An inertial sensor comprising:
    a substrate;
    a movable mass spaced apart from a surface of the substrate, the movable mass being adapted for motion about a rotational axis positioned between first and second ends of the movable mass in response to a first force imposed upon the movable mass in a first direction that is perpendicular to the surface of the substrate; and
    a damping system configured to limit motion of the movable mass in a second direction perpendicular to the first direction, the damping system including:
        a first damping structure coupled to the movable mass;
        a second damping structure adjacent to the first damping structure, the first and second damping structures being spaced apart from the surface of the substrate; and
        a spring structure interconnected between the movable mass and the second damping structure, wherein the first and second damping structures are spaced apart by a gas-containing gap having a predefined width, the second damping structure is configured to become immovable relative to the first damping structure in response to a second force imposed upon the movable mass in the second direction, the first damping structure is configured to move together with the movable mass in response to the second force, and the width of the gap is reduced as the first damping structure moves in the second direction thereby causing squeezing of the gas in the gap.

5. The inertial sensor of claim 1 further comprising:
multiple first damping structures coupled to and extending from the second end of the movable mass, the first damping structure being one of the multiple first damping structures;
multiple second damping structures interleaved with the multiple first damping structures, the second damping structure being one of the multiple second damping structures.

6. An inertial sensor comprising:
a substrate;
a movable mass spaced apart from a surface of the substrate, the movable mass being adapted for motion about a rotational axis positioned between first and second ends of the movable mass in response to a first force imposed upon the movable mass in a first direction that is perpendicular to the surface of the substrate;
a damping system configured to limit motion of the movable mass in a second direction perpendicular to the first direction, the damping system including:
multiple first damping structures coupled to and extending from the second end of the movable mass;
multiple second damping structures interleaved with the multiple first damping structures, the multiple first and second damping structures being spaced apart from the surface of the substrate; and
a spring structure interconnected between the movable mass and the second damping structure, wherein a first spring end of the spring structure is coupled to the second end of the movable mass; and
a beam element spaced apart from the surface of the substrate, the beam element being displaced away from the second end of the movable mass, wherein a second spring end of the spring structure is coupled to the beam element and the multiple second damping structures are coupled to and extend from the beam element toward the second end of the movable mass.

7. The inertial sensor of claim 6 wherein:
the rotational axis is parallel to the surface of the substrate;
the beam element has a longitudinal dimension between first and second beam ends of the beam element that is parallel to the rotational axis; and
the inertial sensor further comprises first and second damping stops coupled to the surface of the substrate and positioned proximate corresponding ones of the first and second beam ends.

8. The inertial sensor of claim 7 wherein the first and second beam ends of the beam element are configured to contact the corresponding first and second damping stops in response to a second force imposed upon the movable mass in the second direction, wherein the second direction is parallel to the longitudinal dimension of the beam element.

9. The inertial sensor of claim 6 wherein:
the rotational axis is parallel to the surface of the substrate;
the beam element has a longitudinal dimension that is parallel to the rotational axis; and
the inertial sensor further comprises at least one damping stop coupled to the surface of the substrate and positioned proximate an intermediate region of the beam element between first and second beam ends of the beam element.

10. The inertial sensor of claim 9 wherein the beam element is configured to contact the at least one damping stop in response to a second force imposed upon the movable mass in the second direction, wherein the second direction is perpendicular to the longitudinal dimension of the beam element.

11. An inertial sensor comprising:
a substrate;
a movable mass spaced apart from a surface of the substrate, the movable mass being adapted for motion about a rotational axis positioned between first and second ends of the movable mass in response to a first force imposed upon the movable mass in a first direction that is perpendicular to the surface of the substrate, wherein the rotational axis is parallel to the surface of the substrate;
a damping system configured to limit motion of the movable mass in a second direction perpendicular to the first direction, the damping system including:
multiple first damping structures coupled to and extending from the second end of the movable mass;
multiple second damping structures interleaved with the multiple first damping structures, the multiple first and second damping structures being spaced apart from the surface of the substrate;
a spring structure interconnected between the movable mass and the second damping structure;
a beam element spaced apart from and parallel to the surface of the substrate, the beam element being oriented perpendicular to the rotational axis, wherein a first spring end of the spring structure is coupled to the movable mass, a second spring end of the spring structure is coupled to a first beam end of the beam element, and the multiple second damping structures are coupled to and extend from the beam element, wherein the first and second damping structures are oriented parallel to the rotational axis; and
a damping stop coupled to the surface of the substrate and positioned proximate a second beam end of the beam element, wherein the beam element is configured to contact the damping stop in response to a second force imposed upon the movable mass in the second direction, wherein the second direction is perpendicular to the rotational axis.

12. An inertial sensor comprising:
a substrate;
a movable mass spaced apart from a surface of the substrate, the movable mass being adapted for motion about a rotational axis positioned between first and second ends of the movable mass in response to a first force imposed upon the movable mass in a first direction that is perpendicular to the surface of the substrate, the movable mass including a first portion between the rotational axis and the first end and a second portion between the rotational axis and the second end, wherein the second portion has a greater mass than the first portion; and
a damping system located at the second portion, the damping system being configured to limit motion of the movable mass in a second direction perpendicular to the first direction, the damping system including:
a first damping structure coupled to the movable mass;
a second damping structure adjacent to the first damping structure, the first and second damping structures being spaced apart from the surface of the substrate; and
a spring structure interconnected between the movable mass and the second damping structure, wherein the first and second damping structures are spaced apart by a gas-containing gap having a predefined width, the second damping structure is configured to become immovable relative to the first damping structure in response to a second force imposed upon the movable mass in the second direction, the first damping structure is configured to move together with the movable mass in response to the second force, and the width of the gap is reduced as the first damping structure moves in the second direction thereby causing squeezing of the gas in the gap.

13. The inertial sensor of claim 12 wherein the first and second damping structures of the damping system are configured to contribute to the greater mass of the second portion of the movable mass relative to the first portion of the movable mass.

14. The inertial sensor of claim 12 further comprising at least one travel stop coupled to the surface of the substrate proximate the movable mass, and the damping system is configured to reduce a contact force between the movable mass and the at least one travel stop in response to limiting the motion of the movable mass in the second direction.

\* \* \* \* \*